Patented Dec. 25, 1923.

1,478,889

UNITED STATES PATENT OFFICE.

IVAR WALFRID CEDERBERG, OF BERLIN-STEGLITZ, GERMANY, ASSIGNOR TO NORSK HYDRO-ELEKTRISK KVAELSTOFAKTIESELSKAB, OF CHRISTIANIA, NORWAY.

PROCESS OF PURIFYING GASES FOR AMMONIA SYNTHESIS.

No Drawing. Application filed October 5, 1923. Serial No. 666,850.

*To all whom it may concern:*

Be it known that I, IVAR WALFRID CEDERBERG, a subject of the King of Sweden, residing at Berlin-Steglitz, Germany, have invented certain new and useful Improvements in Processes of Purifying Gases for Ammonia Synthesis; and I do hereby declare the following to be a full, clear, and exact description of the invention, such as will enable others skilled in the art to which it appertains to make and use the same.

As it is known, a necessary condition for the synthetic production of ammonia from its elements by means of catalyzers is that the gases to be used with the catalysis have to be freed as much as possible from all kinds of impurities. With this object in view, the use of metallic sodium has previously been suggested as a means of absorption for such gases, which are difficult to eliminate quantitatively in any other manner.

In order to be able to utilize to the full the purifying capacity of the metal and make the purifying process perfectly effective, it is, however, necessary to use the metal in a form in which it is suitable for contact with the gases. This is effected by the present invention in that a solution of an alkali or alkali earth metal in liquid ammonia is used as a means of absorption, through which the gases can pass before going to the catalyzer, adequately under pressure and in a finely divided state. It has been proved that such a solution, which in all probability is colloidal, has the power to completely free the gases from impurities such as oxygen, water vapour, carbon dioxide, carbon monoxide, etc., whereby the vitality of the catalyzer is considerably prolonged. The absorption capacity of the solution is also very good at a relatively low temperature, which is of great importance as the consumption of the means of solution, on account of the slight tension of ammonia, is small and the contents of ammonia of the gases before catalyzation can be reduced to a few tenths of a per cent by means of a pressure of say 100 atmospheres.

*Example I.*

The mixture to be used for the production of ammonia, is passed through a solution of 60 g. sodium in 420 cm.$^3$ liquid ammonia at a temperature of —20° C. and a pressure of 100 atm. A catalyst used for the gas so treated could after 10 hours not be seen to have been altered, whereas the same gas purified only by dry sodium ribbons, rendered the catalyst unsuitable for use after 5 hours.

*Example II.*

The gas mixture is passed over calcium ribbons which are held in a moist state by liquid ammonia, so that a saturated solution is always present. The temperature is 20° C. and the pressure 150 atm.

I claim:—

1. Process of purifying gas for the synthetic production of ammonia which comprises freeing the gas mixture from impurities by treatment with a solution of an alkali forming metal in liquid ammonia.

2. Process of purifying gases for ammonia synthesis which comprises passing the gas mixture under pressure considerably above atmospheric pressure in contact with a solution of an alkali forming metal in liquid ammonia.

3. Process for purifying gases for ammonia synthesis which comprises passing the gas mixture at a pressure of about 100 atmospheres in contact with a solution of an alkali-forming metal in liquid ammonia.

4. Process for purifying gases for ammonia synthesis which comprises passing the gas mixture at a pressure considerably above atmospheric pressure in contact with a solution of sodium in liquid ammonia.

5. Process of purifying gases for ammonia synthesis which comprises passing the gas mixture at a pressure of not less than about 100 atmospheres through a solution of sodium in liquid ammonia.

In testimony that I claim the foregoing as my invention, I have signed my name in presence of two subscribing witnesses.

IVAR WALFRID CEDERBERG.

Witnesses:
 EDWIN GUSTMAN,
 A. GIRAUSSON.